United States Patent [19]

Sanderson et al.

[11] Patent Number: 4,647,470
[45] Date of Patent: Mar. 3, 1987

[54] LOW-ACETYL GELLAN GUM BLENDS

[75] Inventors: George R. Sanderson, Carlsbad; Ross C. Clark, San Diego; Ken Clare, Vista; David J. Pettitt, Poway, all of Calif.

[73] Assignee: Merck & Co., Inc., Rahway, N.J.

[21] Appl. No.: 802,646

[22] Filed: Nov. 27, 1985

[51] Int. Cl.[4] .................. A23L 1/06; A23L 1/04; A23L 1/187
[52] U.S. Cl. .................. 426/573; 426/574; 426/579; 426/104; 426/804
[58] Field of Search ............... 426/573, 575, 577, 804, 426/104, 574, 576, 579

[56] References Cited

U.S. PATENT DOCUMENTS

| 4,326,052 | 4/1982 | Kang et al. | 426/573 |
| 4,326,053 | 4/1982 | Kang et al. | 426/573 |
| 4,369,125 | 1/1983 | Kragen et al. | 426/573 |
| 4,517,216 | 5/1985 | Shim | 426/573 |
| 4,563,366 | 1/1986 | Baird et al. | 426/573 |

FOREIGN PATENT DOCUMENTS 0088051  5/1984  Japan .................. 426/579

Primary Examiner—Jeanette Hunter
Attorney, Agent, or Firm—Gabriel Lopez; Hesna J. Pfeiffer

[57] ABSTRACT

Blends of low-acetyl gellan gum with xanthan gum and locust bean gum are described. The combination of xanthan gum/locust bean gum modifies the brittleness of the gellan gum gel and provides a useful range and diversity of gel textures which find particular utility in gelled food formulations. In place of locust bean gum, konjak, tara, or Cassia gums may be used.

9 Claims, No Drawings

LOW-ACETYL GELLAN GUM BLENDS

BACKGROUND OF THE INVENTION

The use of gellan gum to form gels in the presence of mono- or divalent cations is known. A particular utility of these gels is in the formation of gelled food products. Several publications have taught the use of gellan gum in such applications e.g., Sanderson et al., Gums and Stabilizers for the Food Industry 2, G. O. Phillips et al. (ed.), 201–210, Pergamon Press (1984); Sanderson et al., "Gellan Gum", Food Technology, 63–70, April 1983; and Japanese patent application 88051/1984, May 21, 1984. These publications suggest blending gellan gum with other hydrocolloids for the purpose of modifying gel texture. Example 7 of the Japanese application teaches an extruded noodle using gellan gum, locust bean gum, and xanthan gum in a 2:1:1 ratio at a total concentration of 0.8 wt.%.

Modification of the texture of xanthan/lbg gels resulting from adding a third component such as guar, agar, or carrageenan is described in P. Kovacs, Food Technology, Vol. 27, No. 3, pp. 26–30 (1973). The third component imparts some of its textural characteristics to the xanthan/lbg gel.

SUMMARY OF THE INVENTION

It has now been found that blends of low-acetyl gellan gum + xanthan gum/galactomannan in the ratios by weight of 95:5 to 5:95 wherein the ratios of xanthan gum to galactomannan range from 4:1 to 1:4 are particularly useful in gelled food applications.

DETAILED DESCRIPTION

Gellan gum refers to the extracellular polysaccharide obtained by the aerobic fermentation of the microorganism, *Pseudomonas elodea,* in a suitable nutrient medium. Various forms of gellan gum have been described. (U.S. Pat. No. 4,503,084, Baird et al.) e.g., native, deacetylated, deacetylated clarified, partially deacetylated, and partially deacetylated clarified. As used hereinafter, "gellan" gum shall refer only to low acetyl (LA) gellan gum, i.e., a gellan gum wherein the acetyl level is 0.3–0% (wt.).

Xanthan gum is an extracellular polysaccharide produced during fermentation of carbohydrates by *Xanthamonas campestris* and other bacteria of the genus Xanthomonas. The gum is manufactured in industrial scale and is used widely as, for example, a thickener in foods.

Cassia gum, like lbg, is a pod extract, derived from *Cassia occidentalis* or *fistula*.

The following plant extracts are described in "Polysaccharides in Food", Blanshard et al., 232–235, Buttersworth & Co., Ltd., 1979.

Locust bean gum (lbg) is an extract of the locust bean or carob, *Ceratonia siligua.* It is commercially available and used as a stabilizer in foods such as ice cream, sausages, and cheese. Chemically, lbg is a galactomannan.

Konjak (or konjac) gum is a glucomannan extracted from the plant *Amorphophallus konjac.*

Tara gum is a vegetable gum derived from the seed of the legume *Cesalpinia spinosa.*

The texture profile of a gel can be evaluated in terms of four parameters: modulus, hardness, brittleness, and elasticity. These are standard gel properties that are determined, for example, on an Instron 4201 Universal Testing Machine, which compresses the sample to about ¼ of its original height two times in succession. The sample is compressed twice so that the amount of structure breakdown can be determined.

Modulus is the first parameter that is determined when testing a sample. The modulus is the initial slope of the force-deformation curve. This is a measure of how the sample behaves when compressed a small amount. The modulus usually correlates very closely with a sensory perception of the sample's firmness. Modulus is expressed in units of force per unit area (pounds per square inch or Newton's per square centimeter).

Hardness is defined as the maximum force that occurs at any time during the first compression cycle. It may occur when the gel initially breaks, or it may occur later in the test as the sample is flattened and deformed. In most cases, the hardness is correlated to the rupture strength of the material. It is expressed in units of force (pounds or Newtons).

Brittleness is defined as the first significant drop in the force-deformation curve during the first compression cycle. This is the point of first fracture or cracking of the sample. A gel that fractures very early in the compression cycle is considered to be more brittle or fragile than one that breaks later. Brittleness is measured as the % strain required to break the gel. As the number gets smaller, it indicates a more brittle gel at a lower strain level.

Following the first compression cycle, the force is removed from the sample as the Instron crosshead moves back up.

A measure of the sample's elasticity is taken as the second compression cycle is begun. By noting where the force begins to increase during this second compression cycle, a measure of the sample height may be obtained. If the sample returned to its original height, the elasticity would be 100%. The elasticity is a measure of how much the original structure of the sample was broken down by the initial compression. In sensory terms, it can be thought of as how "rubbery" the sample will feel in the mouth. The units are dimensionless and expressed as a %.

It has been found that varying the ratio of xanthan:-galactomannan has an effect on three of these parameters: hardness, modulus, and brittleness. But, surprisingly and unexpectedly, although the addition of xanthan/galactomannan increases the elasticity of gellan gels, varying the ratio of xanthan to galactomannan has little effect on elasticity. Thus, this three-component blend allows the practitioner to prepare a broad range of gelled food products with reduced brittleness and greater elasticity relative to LA gellan gum along and a controlled degree of hardness and modulus.

The blend is particularly useful in pet foods, i.e., gelled or restructured meat products; confectionery jellies; jams; low calorie jams and jellies; gelled milk desserts; water-based desserts; aspics; pie fillings; vegetable, fruit, or fish gels; syrups; or toppings. Depending on the particular food, use levels of the blends can range from 0.1 to 1.5%, based on total product weight.

The gum blends of this invention comprise gellan:(xanthan/galactomannan) in the ratios by weight 95:5 to 5:95 wherein the ratio xanthan/galactomannan ranges from 4:1 to 1:4 and the galactomannan is locust bean or tara gum with the proviso that when the galactomannan is lbg the ratio is not 2:1:1. The invention also comprises aqueous gels comprising 0.1 to 1.5% (wt.) of the gum blends.

In place of lbg or tara, either Cassia gum or konjak gum may be used on a weight-for-weight basis. The use of konjak produces a greater loss in hardness and a smaller decrease in brittleness relative to lbg.

The invention also comprises a gelled food product comprising a matrix having one or more food ingredients dispersed therein, said food ingredients being selected from the group consisting of vegetable, fruit, meat, fish, sugar, milk, and mixtures thereof, said matrix comprising 0.1 to 1.5%, based on total product weight, of a blend of gellan:(xanthan/galactomannan) in the ratios by weight 95:5 to 5:95 wherein the ratio xanthan/galactomannan ranges from 4:1 to 1:4 and the galactomannan is locust bean or tara gum.

The gelled food products are restructured meat; confectionary jellies; jams; low caloric jams and jellies; gelled milk desserts; water-based desserts; aspics; pie fillings; vegetable, fruit, or fish gels; syrups or toppings.

The gum blends of Table I are within the scope of this invention.

TABLE I

| | Gum Blends Ratio by Weight | | |
|---|---|---|---|
| Blend | Gellan | Xanthan | Galac |
| 1 | 5 | 1 | 4 |
| 2 | 10 | 3 | 7 |
| 3 | 10 | 7 | 3 |
| 4 | 5 | 4 | 1 |
| 5 | 10 | 1 | 1 |
| 6 | 5 | 1 | 1 |
| 7 | 2.5 | 1 | 1 |
| 8 | 1 | 1 | 1 |
| 9 | 0.66 | 1 | 1 |
| 10 | 4 | 0.7 | 0.3 |
| 11 | 3 | 1.4 | 0.6 |
| 12 | 2 | 2.1 | 0.9 |
| 13 | 1 | 2.8 | 1.2 |
| 14 | 8 | 1 | 1 |
| 15 | 3 | 1 | 1 |
| 16 | 2 | 1.5 | 1.5 |
| 17 | 1 | 2 | 2 |
| 18 | 4 | 0.3 | 0.7 |
| 19 | 3 | 0.6 | 1.4 |
| 20 | 2 | 0.9 | 2.1 |
| 21 | 1 | 1.2 | 2.8 |
| 22 | 2 | 2 | 1 |
| 23 | 2.5 | 1.5 | 1 |
| 24 | 1.33 | 1 | 1 |
| 25 | 2 | 1 | 1 |

The invention is further defined by reference to the following examples, which are intended to be illustrative and not limiting.

EXAMPLE 1

Evaluation of Gellan:Xanthan:lbg Blends

Various ratios of xanthan/lbg (95:5, 80:20, 70:30, 30:70, 20:80, 5:95) were evaluated in combination with gellan gum. As shown in Table 1—1, each blend ratio affects the texture of gellan gum gels in a way that is determined, for the most part, by the predominant hydrocolloid in the xanthan/lbg blend. For example, the addition of 0.25% xanthan or 0.25% lbg alone has virtually no effect on the hardness value of a 0.25% gellan gum gel (1.92 lbs and 2.00 lbs, respectively). The addition of 0.25% xanthan/lbg (4:1 to 1:4), taking advantage of their combined effect, increases the hardness value to between 2.52 and 3.12 lbs. Shifting the ratio of the xanthan/lbg blend outside the range 4:1 to 1:4 so that one or the other hydrocolloid predominates gives a gel whose hardness value shifts towards what the value would be if the predominant hydrocolloid was used, alone, in combination with gellan gum.

The data for the modulus and brittleness parameters show that gellan gum gels, in combination with xanthan/lbg (varying ratios), exhibit the same trends seen with the hardness parameter, i.e., the extent of texture modification is dependent on the ratio of the added xanthan/lbg blend.

However, while the addition of xanthan/lbg to gellan gum increases gel elasticity, varying the ratios of the xanthan/lbg blend does not significantly change the elasticity value.

TABLE 1-1

| | Effect on Xanthan/Lbg on Gellan Gels[1] | | | | | |
|---|---|---|---|---|---|---|
| | Xan[2]/ lbg[3] | Gellan (%) | Xan/ lbg (%) | Hardness (lbs) | Modulus (lbs/in$^2$) | Brit. (%) | Elas. (%) |
| 1. | — | 0.25% | — | 1.92 | 1.84 | 35.00 | 11.60 |
| 2. | — | 0.50 | — | 4.71 | 3.88 | 33.86 | 13.78 |
| 3. | 100:0 | 0.25 | 0.25 | 1.92 | 1.7 | 31.9 | 31.1 |
| 4. | 5:95 | 0.25 | 0.25 | 2.14 | 1.72 | 33.1 | 40.5 |
| 5. | 20:80 | 0.25 | 0.25 | 2.52 | 1.3 | 39.2 | 35 |
| 6. | 30:70 | 0.25 | 0.25 | 2.83 | 1.2 | 41.5 | 35.3 |
| 7. | 70:30 | 0.25 | 0.25 | 3.12 | 1.2 | 44.4 | 30.9 |
| 8. | 80:20 | 0.25 | 0.25 | 2.77 | 1.2 | 42.0 | 29.4 |
| 9. | 95:5 | 0.25 | 0.25 | 2.31 | 1.5 | 36.2 | 32.1 |
| 10. | 0:100 | 0.25 | 0.25 | 2.00 | 1.9 | 30.6 | 35.3 |

[1]0.004 M $Ca^{++}$ was used to cause gelations.
[2]KELTROL$^R$, xanthan gum, trademark of Merck & Co., Inc., Rahway, N.J.
[3]SUPERCOL 911, locust bean gum.

EXAMPLE 2

Effect of 1:1 Blends of Xanthan/Lbg on Gellan Gels

Blends of xanthan/lbg (KELTROL ® and Supercol-911) in the ratio 1:1 were added to gellan and the resulting gels evaluated. The gellan was gelled using 0.004M $Ca^{++}$. Gum concentrations are by weight. The data of Table 2-1 were obtained.

TABLE 2-1

| | Gellan (%) | Xan./ lbg (%) | Ratio | Hardness (lbs) | Modulus (lbs/in$^2$) | Brit. (%) | Elas. (%) |
|---|---|---|---|---|---|---|---|
| 1. | 0.25 | 0.0 | — | 1.92 | 1.84 | 35.00 | 11.60 |
| 2. | 0.00 | 1.0 | — | 4.13 | 0.28 | 69.79 | 77.8 |
| 3. | 0.25 | 0.05 | 10:1:1 | 2.09 | 1.5 | 34.6 | 17.5 |
| 4. | 0.25 | 0.1 | 5:1:1 | 2.77 | 1.72 | 36.55 | 24.23 |
| 5. | 0.25 | 0.2 | 2.5:1:1 | 2.93 | 1.1 | 44.08 | 28.99 |
| 6. | 0.25 | 0.50 | 1:1:1 | 4.87 | 0.51 | 58.3 | 43.53 |
| 7. | 0.25 | 0.75 | .66:1:1 | 7.14 | 0.47 | 61.18 | 51.17 |

EXAMPLE 3

Effect of 7:3 Blends of Xanthan/Lbg on Gellan Gels

Blends of xanthan/lbg (KELTROL ® and Supercol-911) in the ratio 7:3 were added to gellan and the resulting gels evaluated. The gellan was gelled using 0.004M $Ca^{++}$. The total gum concentration was 0.5% by weight. The data of Table 3-1 were obtained.

TABLE 3-1

| | Gellan (%) | Xan./ lbg (%) | Hardness (lbs) | Modulus (lbs/in$^2$) | Brit. (%) | Elas. (%) |
|---|---|---|---|---|---|---|
| 1. | 0.40 | 0.10 | 4.06 | 2.9 | 35.6 | 22.4 |
| 2. | 0.30 | 0.20 | 3.34 | 1.5 | 40.4 | 26.6 |
| 3. | 0.20 | 0.30 | 2.79 | 0.77 | 50.2 | 26.5 |
| 4. | 0.10 | 0.40 | 2.65 | 0.41 | 62.0 | 42.1 |

TABLE 3-1-continued

| | Gellan (%) | Xan./ lbg (%) | Hardness (lbs) | Modulus (lbs/in²) | Brit. (%) | Elas. (%) |
|---|---|---|---|---|---|---|
| 5. | — | 0.50 | 1.4 | 0.14 | 69.8 | 68.8 |

EXAMPLE 4

Effect of 1:1 Blends of Xanthan/Lbg on Gellan Gels

Blends of xanthan/lbg (KELTROL ® and Supercol-911) in the ratio 1:1 were added to gellan and the resulting gels evaluated. The gellan was gelled using 0.004M $Ca^{++}$. The total gum concentration was 0.5% by weight. The data of Table 4-1 were obtained.

TABLE 4-1

| | Gellan (%) | Xan./ lbg (%) | Hardness (lbs) | Modulus (lbs/in²) | Brit. (%) | Elas. (%) |
|---|---|---|---|---|---|---|
| 1. | 0.40 | 0.10 | 3.98 | 2.7 | 36.0 | 20.6 |
| 2. | 0.30 | 0.20 | 3.41 | 1.42 | 41.6 | 26.6 |
| 3. | 0.20 | 0.30 | 2.97 | 0.71 | 51.6 | 34.0 |
| 4. | 0.10 | 0.40 | 2.54 | 0.41 | 60.3 | 39.6 |
| 5. | — | 0.50 | 2.66 | 0.16 | 69.6 | 73.0 |

EXAMPLE 5

Effect of 3:7 Blends of Xanthan/Lbg on Gellan Gels

Blends of xanthan/lbg (KELTROL ® and Supercol-911) in the ratio 3:7 were added to gellan and the resulting gels evaluated. The gellan was gelled using 0.004M $Ca^{++}$. The total gum concentration was 0.5% by weight. The data of Table 5-1 were obtained.

TABLE 5-1

| | Gellan (%) | Xan./ lbg (%) | Hardness (lbs) | Modulus (lbs/in²) | Brit. (%) | Elas. (%) |
|---|---|---|---|---|---|---|
| 1. | 0.40 | 0.10 | 3.82 | 2.9 | 34.7 | 22.1 |
| 2. | 0.30 | 0.20 | 3.15 | 1.5 | 39.7 | 39.3 |
| 3. | 0.20 | 0.30 | 2.6 | 0.81 | 47.5 | 31.2 |
| 4. | 0.10 | 0.40 | 2.28 | 0.46 | 61.0 | 33.6 |
| 5. | — | 0.50 | 3.53 | 0.16 | 69.9 | 70.8 |

EXAMPLE 6

Canned Pet Food

A series of experiments were run to compare gellan gum and gellan-xanthan/locust bean gum blends to one another at different ratios and use levels in a canned pet food product.

Procedure

Two hundred and seventy five grams of ground pet food meat and offal were weighed into a No. 1 Eastern can. A preweighed amount of gum in 25 mls of water was then added, and the can sealed and autoclaved at 250° F. (121° C.) for 80 minutes. The cans were carefully removed from the pressurized container, gently agitated for 1 minute, allowed to cool undisturbed, and left for a minimum of 24 hours before opening.

The following gums were examined:

| Sample No. | Ratios Tested | | | | | | |
|---|---|---|---|---|---|---|---|
| | 1 | 2 | 3 | 4 | 5 | 6 | 7 |
| Gellan | 40 | 50 | 60 | 60 | 50 | 40 | 100 |
| Xanthan | 40 | 30 | 20 | 20 | 25 | 30 | — |
| LBG | 20 | 20 | 20 | 20 | 25 | 30 | — |
| Total Conc. (wt. %) | 0.6 | 0.6 | 0.6 | 0.4 | 0.4 | 0.4 | 0.4 |

Results

Results showed that by increasing the ratio of xanthan/lbg to gellan a more elastic, less brittle gel was formed around the meat matrix; i.e. 6 was less brittle than 4 and 5, and 1 was less brittle that 2 and 3.

Also, it is found that increasing the concentration of the blend from 0.4% to 0.6% provided a firmer, less brittle gel; i.e., 3 was firmer than 4. In all cases, it was found that the blends gave less brittle and more elastic gels than No. 7, the control sample, which produced a very brittle gel.

EXAMPLE 7

Starch Jelly Candy

| Ingredients: | Wt. % |
|---|---|
| Tap Water | 46.07 |
| Corn Syrup 42DE | 28.89 |
| Sucrose | 17.88 |
| Eclipse "G" (Starch) | 6.56 |
| Gellan Gum | 0.20 |
| KELTROL$^R$ Xanthan Gum | 0.15 |
| LBG | 0.15 |
| Magnesium Chloride | 0.10 |
| | 100.00 |

Procedure

The gellan gum, KELTROL, and lbg are dry blended with approximately 10% of the sucrose and dispersed in the tap water with mechanical agitation. Using a steam kettle, the gellan gum dispersion is heated to 160° F., 71° C. Corn syrup is added to the heated dispersion and mixing continued for one minute.

The starch is dry blended with the remaining ingredients and added to the hot syrup.

Stirring and heating are continued until the mixture reaches 79% soluble solids (approximately 227°F., 108° C.). At this point color and flavor are added to suit and the mix deposited into starch molds. The candies are removed for sanding after approximately 10-12 hours.

EXAMPLE 8

Imitation Strawberry Jam (65% Soluble Solids)

| Ingredients: | Wt. % |
|---|---|
| Frozen Strawberries (thawed) | 39.90 |
| Sucrose | 36.10 |
| Frodex$^R$ Corn Syrup Solids (42DE) | 15.00 |
| Tap Water | 8.00 |
| Gellan Gum | 0.35 |
| KELTROL$^R$ Xanthan Gum | 0.05 |
| LBG | 0.10 |
| Citric Acid, Anhydrous | 0.40 |
| Potassium Sorbate | 0.05 |
| Sodium Benzoate | 0.05 |
| | 100.00 |

Procedure

The gellan gum, KELTROL, and lbg are dry blended with 60 g of sucrose and dispersed with agitation in 80 g of tap water. While stirring, the dispersion is heated to 160° F., 71° C., and this temperature maintained for a total of 15 minutes.

The remaining dry ingredients are combined with the strawberries and the berry mixture heated with stirring to 160° F., 71° C.

The gum solution is combined with the berry mixture and stirring continued over a low flame until the mixture reaches 65% soluble solids.

The mixture is then poured into jars and cooled to room temperature or under refrigeration.

EXAMPLE 9

Low Solids Strawberry Jam (38% Soluble Solids)

| Ingredients: | Wt. % |
|---|---|
| Frozen Strawberries (thawed) | 55.54 |
| Sucrose | 30.00 |
| Tap Water | 13.80 |
| Gellan Gum | 0.20 |
| KELTROL$^R$ Xanthan Gum | 0.05 |
| LBG | 0.10 |
| Calgon (Sodium Hexametaphosphate) | 0.20 |
| Potassium Sorbate | 0.05 |
| Sodium Benzoate | 0.05 |
| Raspberry Color (Warner Jenkinson 7598) | 0.01 |
| | 100.00 |

Procedure

The gellan gum, KELTROL®, and lbg are dry blended with 60 g of sucrose and dispersed with agitation in 138 g of tap water. While stirring, the dispersion is heated to 160° F., 71° C., and this temperature maintained for a total of 15 minutes.

The remaining dry ingredients are combined with the strawberries and the berry mixture heated with stirring to 160° F., 71° C.

The gum solution is combined with the berry mixture and stirring continued over a low flame until the mixture reaches 38% soluble solids.

The mixture is then poured into jars and cooled to room temperature or under refrigeration.

EXAMPLE 10

Neri-Yohkan (Hard Red Bean Jelly)

| Ingredients: | Wt. % |
|---|---|
| A. For Koshian (Red Bean Paste) | |
| Corn Syrup 42DE | 44.10 |
| Tap Water | 34.69 |
| Red Bean Flour | 21.20 |
| Sodium Chloride | 0.01 |
| | 100.00% |
| B. For Final Product: | |
| Koshian | 41.30 |
| Corn Syrup 42DE | 37.20 |
| Tap Water | 21.10 |
| Clarified Gellan Gum | 0.30 |
| KELTROL T$^R$ Xanthan Gum | 0.06 |
| Clarified LBG | 0.04 |
| | 100.00% |

Procedure

A. For Koshian

With mechanical agitation, the corn syrup is added to the tap water with mild heating until a solution is obtained (approximately 3 minutes).

The red bean flour and sodium chloride are added to the mixture which is then heated to 180° F., 82° C., and held at this temperature until a thick, red bean paste is formed.

B. For Final Product

With mechanical agitation, the gellan gum, KELTROL T ®, and lbg are dispersed in the tap water. The dispersion is heated to 160° F., 71° C., and held at this temperature for 10 minutes.

The koshian is added gradually and mixing continued at 170° F., 77° C., for 3 minutes.

The corn syrup is then added with mixing at $\frac{2}{3}$°, 77° C., for a further 3 minutes.

The mix is poured into rectangular-shaped molds and cooled at room temperature or under refrigeration.

EXAMPLE 11

Jelly Cubes for Mitsumame

| Ingredients: | Wt. % |
|---|---|
| Tap Water | 84.465 |
| Sucrose | 15.00 |
| Clarified Gellan Gum | 0.40 |
| KELTROL T$^R$ Xanthan Gum | 0.05 |
| Clarified LBG | 0.05 |
| Magnesium Chloride | 0.025 |
| Sodium Chloride | 0.01 |
| | 100.000% |

Procedure

With mechanical agitation, the gellan gum, KELTROL T, and lbg are dispersed in the tap water and the gellan gum dispersion heated to 160° F., 71° C., and held at this temperature for 10 minutes.

The magnesium chloride and sodium chloride are added and mixing continued for 1 minute.

The sucrose is then added gradually and mixing continued for a further 3 minutes.

The mix is poured into rectangular molds and cooled at room temperature or under refrigeration.

When cold, the gelled product was then cut into dice shaped pieces.

EXAMPLE 12

Fabricated Apricot

| Ingredients | Wt. % |
|---|---|
| I. Fruit Mix | |
| Apricot Puree | 35.00 |
| Sucrose | 10.00 |
| Tap Water | 3.20 |
| Citric Acid | 1.00 |
| Sodium Citrate | 0.80 |
| | 50.00 |
| II. Gellan Gum Mix | |
| Tap Water | 39.20 |
| Sucrose | 10.00 |
| Gellan Gum | 0.50 |
| KELTROL ® R Xanthan Gum | 0.16 |
| LBG | 0.14 |
| | 50.00 |

Procedure

The ingredients in the fruit mix are combined and the mixture heated to 160° F., 71° C., with stirring.

The gellen gum, KELTROL and lbg are dry blended with the sucrose in the gellan gum mix and dispersed in the tap water. The solution is then heated with stirring to 160° F., 71° C., and stirring continued at this temperature for 15 minutes.

The fruit mix and the gellan gum mix are combined and heating and stirring continued until mixing is complete (approximately 15 seconds).

The mixture is poured into molds and cooled to room temperature or under refrigeration.

EXAMPLE 13

Dessert Gel

| Ingredients: | Wt. % |
|---|---|
| Tap Water | 85.73 |
| Sucrose | 13.07 |
| Adipic Acid | 0.58 |
| Sodium Citrate | 0.27 |
| Clarified Gellan Gum | 0.20 |
| KELTROL TF$^R$ Xanthan Gum | 0.06 |
| Clarified LBG | 0.04 |
| Strawberry flavor (Firmenich 59.389/AP) | 0.04 |
| FD & C Red No. 40 | 0.01 |
| | 100.00 |

Procedure

The dry ingredients are blended and added to boiling water with stirring until all the dry ingredients are dissolved.

The solution is poured into molds and cooled at room temperature or under refrigeration.

EXAMPLE 14

Meat Pie Aspic or Jelly

| Ingredients: | Wt. % |
|---|---|
| Tap Water | 98.35 |
| Sodium Chloride | 1.0 |
| Meat Flavoring (Maggi No 7821) | 0.3 |
| Clarified Gellan Gum | 0.25 |
| KELTROL TF$^R$ Xanthan Gum | 0.05 |
| Clarified LBG | 0.05 |
| | 100.00 |

Procedure

The gums are dispersed in the water and the dispersion heated to 170° F., 76.6° C.

Salt and meat flavoring are added to the resulting solution which is then poured into appropriate containers and allowed to cool to room temperature.

EXAMPLE 15

Lemon Pie Filling

| Ingredients: | Wt. % |
|---|---|
| Water | 72.818 |
| Sugar | 21.86 |
| Col-Flo 67 Starch (National Starch) | 3.56 |
| Powdered Lemon Juice/Corn Syrup | 1.00 |
| Citric Acid | 0.32 |
| Gellan Gum | 0.10 |
| Salt | 0.08 |
| KELTROL$^R$ Xanthan Gum | 0.08 |
| LBG | 0.08 |
| Calcium Chloride | 0.05 |
| Calgon (Sodium Hexametaphosphate) | 0.04 |
| Titanium Dioxide | 0.01 |
| FD & C Yellow No. 5 | 0.002 |
| | 100.000 |

Procedure

The gellan gum, sugar, starch, titanium dioxide, Calgon, xanthan gum, lbg, and color are thoroughly mixed together and the resulting mixture sieved through a fine mesh screen.

The lemon juice powder, salt, citric acid and calcium chloride are dry blended and the blend set aside.

The mix containing the gellan gum is added to the water under shear in a steam jacketed kettle and mixing continued for 3 to 4 minutes.

This slurry is then heated to 190° F., 88° C., and held 5 minutes at this temperature.

The blend containing the lemon juice powder is added to the hot mix with stirring until thoroughly dispersed.

The uniform mix is then removed from the heat, poured into a precooked pie shell, cooled and refrigerated.

EXAMPLE 16

Structured Meat

| Ingredients: | Wt. % |
|---|---|
| Cooked Drained Ground Beef | 53.62 |
| Water | 44.26 |
| Glucono-Delta-Lactone | 1.11 |
| Gellan Gum | 0.35 |
| Potassium Sorbate | 0.15 |
| Sodium Metabisulfite | 0.15 |
| Calgon (Sodium Hexametaphosphate) | 0.13 |
| KELTROL$^R$ Xanthan Gum | 0.10 |
| LBG | 0.10 |
| Calcium Chloride | 0.03 |
| | 100.00 |

Procedure

A blend of the gellan gum, xanthan gum, lbg and Calgon is added to the water under high shear and mixing continued for 4 to 5 minutes.

After heating the mix to 180° F., 82° C., the meat is added with stirring. Stirring is continued for 1 minute and a blend of potassium sorbate, sodium metabisulfite, glucono-delta-lactone and calcium chloride added.

The final mix is removed from heat and cooled under refrigeration.

When cold, the gelled meat is cut into chunks.

EXAMPLE 17

Vanilla Flan

| Ingredients: | Wt. % |
|---|---|
| Milk, Whole | 86.166 |
| Sugar, Baker's Special | 13.03 |
| Gellan Gum | 0.35 |
| KELTROL Xanthan Gum | 0.06 |
| LBG | 0.06 |
| Calgon (Sodium Hexametaphosphate) | 0.17 |
| Salt | 0.09 |
| Vanilla No. 15 | 0.09 |
| FD & C Yellow No. 5 | 0.003 |
| FD & C Yellow No. 6 | 0.001 |
| | 100.000 |

Procedure

The dry ingredients are blended together and added to the milk with vigorous agitation.

The mixture is heated to 160° F., 71° C., and held at this temperature for 10 minutes before being poured into serving dishes and cooled to 40° F., 4° C.

What is claimed is:

1. A gelling composition comprising a blend of gellan (A):xanthan/galactomannan(B) in the ratios (A):(B) by weight 95:5 to 5:95 wherein the ratio xanthan/galactomannan ranges from 4:1 to 1:4 and the galactomannan is locust bean or tara gum with the proviso that when the galactomannan is locust bean gum the ratio is not 2:1:1.

2. A blend of claim 1 wherein the galactomannan is locust bean gum.

3. A blend of claim 1 wherein the galactomannan is tara gum.

4. A blend of claim 1 of the ratios by weight:

| Gellan | Xanthan | Galactomannan |
|---|---|---|
| 5 | 1 | 4 |
| 10 | 3 | 7 |
| 10 | 7 | 3 |
| 5 | 4 | 1 |
| 10 | 1 | 1 |
| 5 | 1 | 1 |
| 2.5 | 1 | 1 |
| 1 | 1 | 1 |
| 0.66 | 1 | 1 |
| 4 | 0.7 | 0.3 |
| 3 | 1.4 | 0.6 |
| 2 | 2.1 | 0.9 |
| 1 | 2.8 | 1.2 |
| 8 | 1 | 1 |
| 3 | 1 | 1 |
| 2 | 1.5 | 1.5 |
| 1 | 2 | 2 |
| 4 | 0.3 | 0.7 |
| 3 | 0.6 | 1.4 |
| 2 | 0.9 | 2.1 |
| 1 | 1.2 | 2.8 |
| 2 | 2 | 1 |
| 2.5 | 1.5 | 1 |
| 1.33 | 1 | 1 |
| 2 | 1 | 1 |

5. An aqueous gel comprising 0.1 to 1.5% (wt.) of the blend of claim 1.

6. An aqueous gel of claim 5 comprising in the ratios by weight:

| Gellan | Xanthan | Galactomannan |
|---|---|---|
| 5 | 1 | 4 |
| 10 | 3 | 7 |
| 10 | 7 | 3 |
| 5 | 4 | 1 |
| 10 | 1 | 1 |
| 5 | 1 | 1 |
| 2.5 | 1 | 1 |
| 1 | 1 | 1 |
| 0.66 | 1 | 1 |
| 4 | 0.7 | 0.3 |
| 3 | 1.4 | 0.6 |
| 2 | 2.1 | 0.9 |
| 1 | 2.8 | 1.2 |
| 8 | 1 | 1 |
| 3 | 1 | 1 |
| 2 | 1.5 | 1.5 |
| 1 | 2 | 2 |
| 4 | 0.3 | 0.7 |
| 3 | 0.6 | 1.4 |
| 2 | 0.9 | 2.1 |
| 1 | 1.2 | 2.8 |
| 2 | 2 | 1 |
| 2.5 | 1.5 | 1 |
| 1.33 | 1 | 1 |
| 2 | 1 | 1 |

7. A gelled food product comprising a matrix having one or more food ingredients dispersed therein, said food ingredients being selected from the group consisting of vegetable, fruit, meat, fish, sugar, milk, and mixtures thereof, said matrix comprising 0.1 to 1.5%, based on total product weight, of a blend of gellan (A): xanthan/galactomannan (B) in the ratios (A):(B) by weight 95:5 to 5:95 wherein the ratio xanthan/galactomannan ranges from 4:1 to 1:4 and the galactomannan is locust bean or tara gum.

8. A gelled food product of claim 7 which is a restructured meat; a confectionary jelly; a jam; a low caloric jam or jelly; a gelled milk dessert; a water-based dessert; an aspic; a pie filling; a vegetable, fruit, or fish gel; a syrup; or a topping.

9. A gelled food product of claim 7 comprising in the ratios by weight:

| Gellan | Xanthan | Galactomannan |
|---|---|---|
| 5 | 1 | 4 |
| 10 | 3 | 7 |
| 10 | 7 | 3 |
| 5 | 4 | 1 |
| 10 | 1 | 1 |
| 5 | 1 | 1 |
| 2.5 | 1 | 1 |
| 1 | 1 | 1 |
| 0.66 | 1 | 1 |
| 4 | 0.7 | 0.3 |
| 3 | 1.4 | 0.6 |
| 2 | 2.1 | 0.9 |
| 1 | 2.8 | 1.2 |
| 8 | 1 | 1 |
| 3 | 1 | 1 |
| 2 | 1.5 | 1.5 |
| 1 | 2 | 2 |
| 4 | 0.3 | 0.7 |
| 3 | 0.6 | 1.4 |
| 2 | 0.9 | 2.1 |
| 1 | 1.2 | 2.8 |
| 2 | 2 | 1 |
| 2.5 | 1.5 | 1 |
| 1.33 | 1 | 1 |
| 2 | 1 | 1 |

* * * * *